US007735118B2

(12) United States Patent
Brok et al.

(10) Patent No.: US 7,735,118 B2
(45) Date of Patent: Jun. 8, 2010

(54) METHOD AND APPARATUS FOR PREVENTING BRIDGING OF SECURE NETWORKS AND INSECURE NETWORKS

(75) Inventors: Jacco Brok, Overijssel (NL); Willem Adriaan Romijn, Zuid-Holland (NL)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1523 days.

(21) Appl. No.: 11/052,260

(22) Filed: Feb. 7, 2005

(65) Prior Publication Data

US 2006/0236093 A1     Oct. 19, 2006

(51) Int. Cl.
*G06F 7/04* (2006.01)
*G06F 15/173* (2006.01)

(52) U.S. Cl. .............................. 726/4; 726/14; 726/15; 709/223; 709/224; 709/225

(58) Field of Classification Search .............. 726/14–15
See application file for complete search history.

(56) References Cited

U.S. PATENT DOCUMENTS 7,328,344 B2 *   2/2008   Chang ......................... 713/175
2002/0157019 A1 * 10/2002   Kadyk et al. ................ 713/201

OTHER PUBLICATIONS

Drom, Authentication for DHCP Messages, Jun. 2001, Network Working Group, pp. 1-17.*

* cited by examiner

*Primary Examiner*—Benjamin E Lanier
(74) *Attorney, Agent, or Firm*—Wall & Tong LLP

(57) ABSTRACT

The invention comprises a method and apparatus for preventing a bridge between a secure network and an insecure network. Specifically, the method comprises monitoring a network device supporting a secure network connection for an attempt to establish an insecure network connection, and terminating the secure network connection in response to detecting the attempt to establish the insecure network connection, where the secure network connection comprises a network layer connection.

18 Claims, 3 Drawing Sheets

METHOD AND APPARATUS FOR PREVENTING BRIDGING OF SECURE NETWORKS AND INSECURE NETWORKS

FIELD OF THE INVENTION

The invention relates to the field of communication networks and, more specifically, to implementation of enterprise network security policies.

BACKGROUND OF THE INVENTION

In order to prevent bridging between secure networks and insecure networks, many enterprises adopt security policies forbidding simultaneous use of secure enterprise network connections and other insecure network connections. As network devices evolve to support multiple network interfaces, however, use of multiple network access technologies for enabling simultaneous network connections has become commonplace. Unfortunately, increased support for simultaneous network connections has increased the risk of security policy breaches.

In general, a combination of mechanisms is typically used to reduce the probability of bridging between secure enterprise networks and insecure networks. For example, firewalls may be used to prevent incoming traffic from insecure networks from accessing the secure enterprise network. Additionally, client software is often installed on network devices for removing routing table entries to Internet connections in response to the establishment of a secure network connection. Unfortunately, such mechanisms have numerous drawbacks.

Although firewalls block inbound Internet traffic, firewalls do not prevent accidental, user-initiated Internet connections. Similarly, firewalls do not prevent automated, software-initiated Internet connections. A drawback of removing routing table entries to Internet connections is that other processes on the network device may re-add the routing table entries, reintroducing a bridge between the secure network and insecure network. This may occur, for example, upon insertion of a wireless card into a network device during an active enterprise network connection. Furthermore, such mechanisms lack security policy enforcement from an enterprise network perspective (i.e., enterprise network servers are unable to determine the status (e.g., active versus inactive) of client software designed to prevent bridging).

SUMMARY OF THE INVENTION

Various deficiencies in the prior art are addressed through the invention of a method and apparatus for preventing a bridge between a secure network and an insecure network. Specifically, a method according to one embodiment of the invention comprises monitoring a network device supporting a secure network connection for an attempt to establish an insecure network connection, and terminating the secure network connection in response to detecting the attempt to establish the insecure network connection, where the secure network connection comprises a network layer connection.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention is discussed in the context of a communications network architecture comprising a secure network and an insecure network; however, the methodology of the invention can readily be applied to other networks and network topologies. In general, the present invention enables the prevention of bridging (i.e., establishment of a bridge) between a secure network and an insecure network. A bridge is broadly defined as a connection between a plurality of networks that enables each bridged network to communicate with each of the other bridged networks. As such, bridging between a secure network and an insecure network thereby exposes the secure network to possible attacks initiated via the insecure network.

By verifying the absence of an insecure network connection to an insecure network during establishment of a secure network connection to a secure network, enterprises thereby prevent bridging between the secure network and insecure networks. Similarly, by terminating an existing secure network connection to a secure network in response to a detected attempt to access an insecure network, bridging between the secure network and the insecure networks is thereby prevented. In other words, the methodologies of the present invention enable service providers, enterprises, and the like to maintain a desired level of network security despite unintentional deviations from established security policies.

Figure 1:
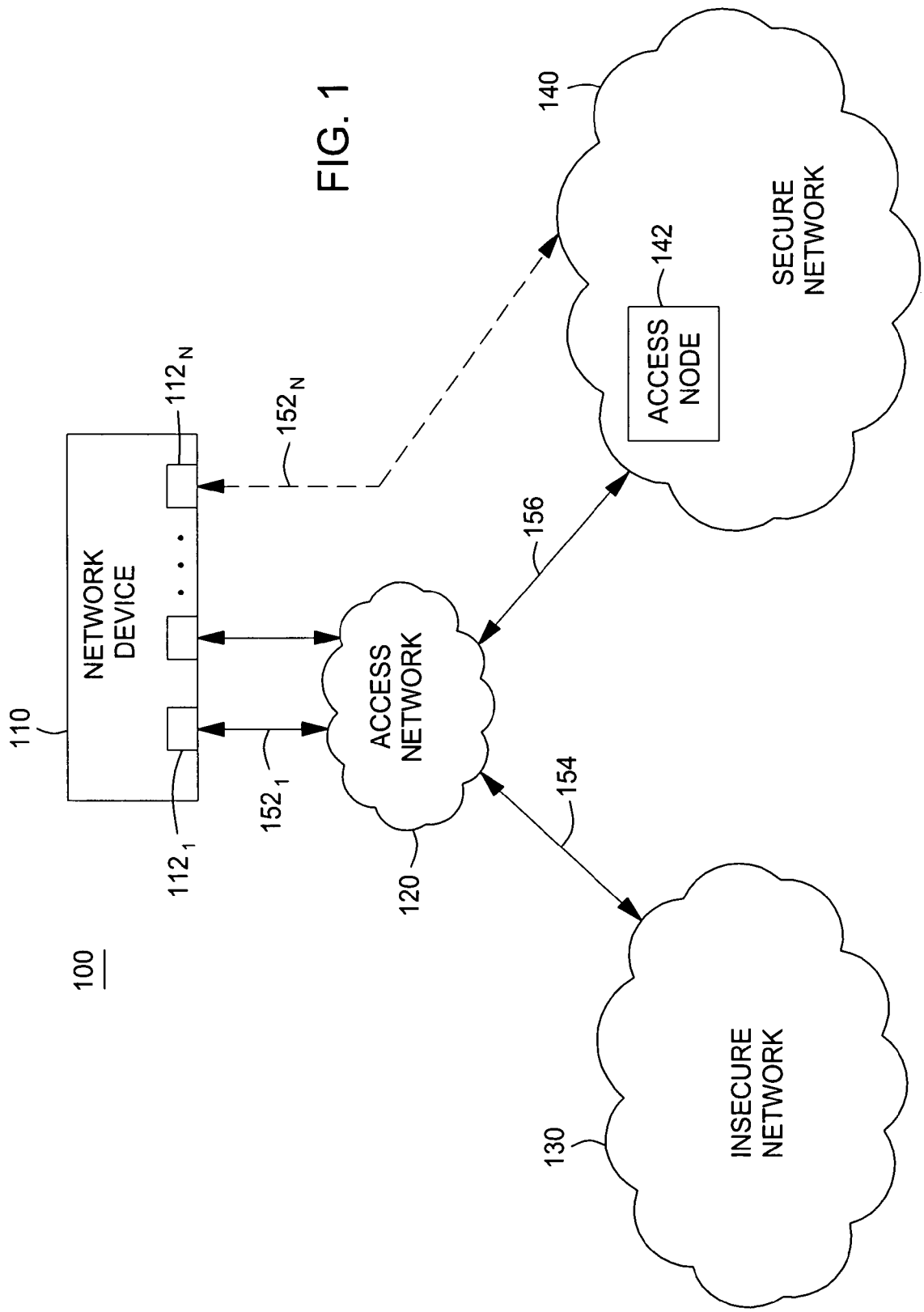
FIG. 1 depicts a high-level block diagram of a communications network architecture.

FIG. 1 depicts a high-level block diagram of a communications network architecture. Specifically, communications network architecture 100 of FIG. 1 comprises a network device (ND) 110, an access network (AN) 120, an insecure network (IN) 130 and a secure network (SN) 140. As depicted in FIG. 1, ND 110 communicates with AN 120 and SN 140. Similarly, AN 120 communicates with IN 130 and SN 140. The ND 110 comprises a network device operable for establishing and maintaining a plurality of connections with an associated plurality of networks. For example, ND 110 comprises a network device such as a laptop computer, a desktop computer, a personal digital assistant, and like network devices operable for establishing and maintaining a plurality of network connections.

As depicted in FIG. 1, the ND 110 comprises a plurality of network interfaces (NIs) $112_1$-$112_N$ (collectively, NIs 112). In general, the NIs 112 comprise network interfaces for establishing a plurality of network connections with a plurality of networks (illustratively, AN 120, IN 130, SN 140, and like networks) using an associated plurality of communication links (CLs) $152_1$-$152_N$ (collectively, CLs 152). In one embodiment, NIs 112 comprise network adapters, i.e., network interface cards (NICs) such as Ethernet cards, wireless cards (e.g., wireless fidelity (WIFI) cards, code division multiple access (CDMA) cards, 802.1x cards, and the like), and like NICs for establishing network connections.

As depicted in FIG. 1, ND 110 communicates with AN 120 using NI $112_1$ and associated CL $152_1$. Similarly, ND 110 communicates with AN 120 using NI $112_2$ and associated CL $152_2$. Furthermore, ND 110 communicates with SN 140 using NI $112_N$ and associated CL $152_N$. In one embodiment, ND 110 establishes an insecure network connection with IN 130 via AN 120. In another embodiment, ND 110 establishes a secure network connection with SN 140. In general, a secure network connection comprises a connection between a network device and a secure network, and an insecure network connection comprises a connection between a network device and an insecure network.

In one embodiment, a secure network comprises an enterprise network, while an insecure network comprises a network other than an enterprise network. In general, an enterprise network is broadly defined as a corporate network comprising security functions for limiting access to the corporate network. In one embodiment, insecure network connections and secure network connections comprise network layer connections. For example, insecure network connections and secure network connections may comprise Internet Protocol (IP) connections.

The AN 120 comprises an access network operable for enabling ND 110 to establish at least one insecure network connection with an insecure network (illustratively, IN 130) and at least one secure network connection with a secure network (illustratively, SN 140). As such, AN 120 comprises at least one of: a public switched telephone network (PSTN), a cable network, a digital subscriber line (DSL) network, a wireless network (e.g., a Universal Mobile Telecommunications System (UMTS) network, a General Packet Radio Service (GPRS) network, and like wireless networks), an Internet service provider (ISP) network, and like access networks as known in the art.

As depicted in FIG. 1, AN 120 communicates with IN 130 via an associated communication link (CL) 154. Similarly, AN 120 communicates with SN 140 via an associated communication link (CL) 156. Although not depicted, the AN 120 comprises various network elements and associated communication links for transporting signaling and bearer traffic between ND 110 and various networks (illustratively, IN 130, SN 140, and like networks).

As depicted in FIG. 1, IN 130 comprises an insecure network (e.g., the Internet) and SN 140 comprises a secure network (e.g., an enterprise network). In one example, SN 140 comprises an enterprise network directly accessible by enterprise employees via network devices directly connected to the enterprise network. Similarly, in another example, SN 140 comprises an enterprise network indirectly accessible by enterprise employees from a remote network device (e.g., a network device located in an enterprise customer location, a network device located in a home office, and the like). It should be noted that AN 120 may comprise at least one of: a secure access network and an insecure access network.

As depicted in FIG. 1, SN 140 comprises an access node (AN) 142 operable for enabling network devices to establish secure connections with SN 140. For example, ND 110 may establish a secure connection with SN 140 via AN 142 using the NIs 112 and associated CLs 152. Although depicted and described with respect to FIG. 2 as comprising one AN, those skilled in the art will appreciate that SN 140 may comprises a plurality of different ANs. For example, SN 140 may comprise a Wireless Fidelity (WI-FI) AN, a cellular AN, a fixed local area network (LAN) AN, and like ANs.

In one embodiment, AN 142 performs functions such as authentication (e.g., device authentication, user authentication, and like), signaling, routing, and like functions. Depending upon the technology utilized by SN 140, AN 142 may comprise a server, a router, a switch, and like access nodes as known in the art. As such, AN 142 is operable for supporting a plurality of secure connections with an associated plurality of network devices via various access networks and associated communication links.

In one embodiment, as depicted in FIG. 1, ND 110 establishes a direct connection with a secure network (e.g., a direct connection with SN 140 via NI $112_N$ and associated CL $152_N$). For example, ND 110 is directly connected to an enterprise LAN. In another embodiment, as depicted in FIG. 1, ND 110 establishes an indirect connection with a secure network via at least one other network (e.g., an indirect connection to SN 140 via NI $112_2$, associated CL $152_2$ and AN 120). For example, ND 110 establishes a connection to a secure enterprise network remotely. In one embodiment, ND 110 may establish an secure connection with the secure network indirectly using at least one secure tunnel, such as a virtual private network (VPN) tunnel traversing AN 120 and accessing SN 140 via a VPN gateway node (illustratively, AN 142) associated with SN 140.

Although depicted as comprising specific numbers of NDs 110, NIs 112, ANs 120, INs 130, SNs 140, ANs 142, CLs 152, CLs 154, and CLs 156, those skilled in the art will appreciate that fewer or more NDs 110, NIs 112, ANs 120, INs 130, SNs 140, ANs 142, CLs 152, CLs 154, and CLs 156 may be used. Similarly, the NDs 110, NIs 112, ANs 120, INs 130, SNs 140, ANs 142, CLs 152, CLs 154, and CLs 156 may be deployed in various different configurations. Furthermore, various other networks, network elements, network devices, and communication links may be deployed in support of the methodologies of the present invention.

Figure 2:
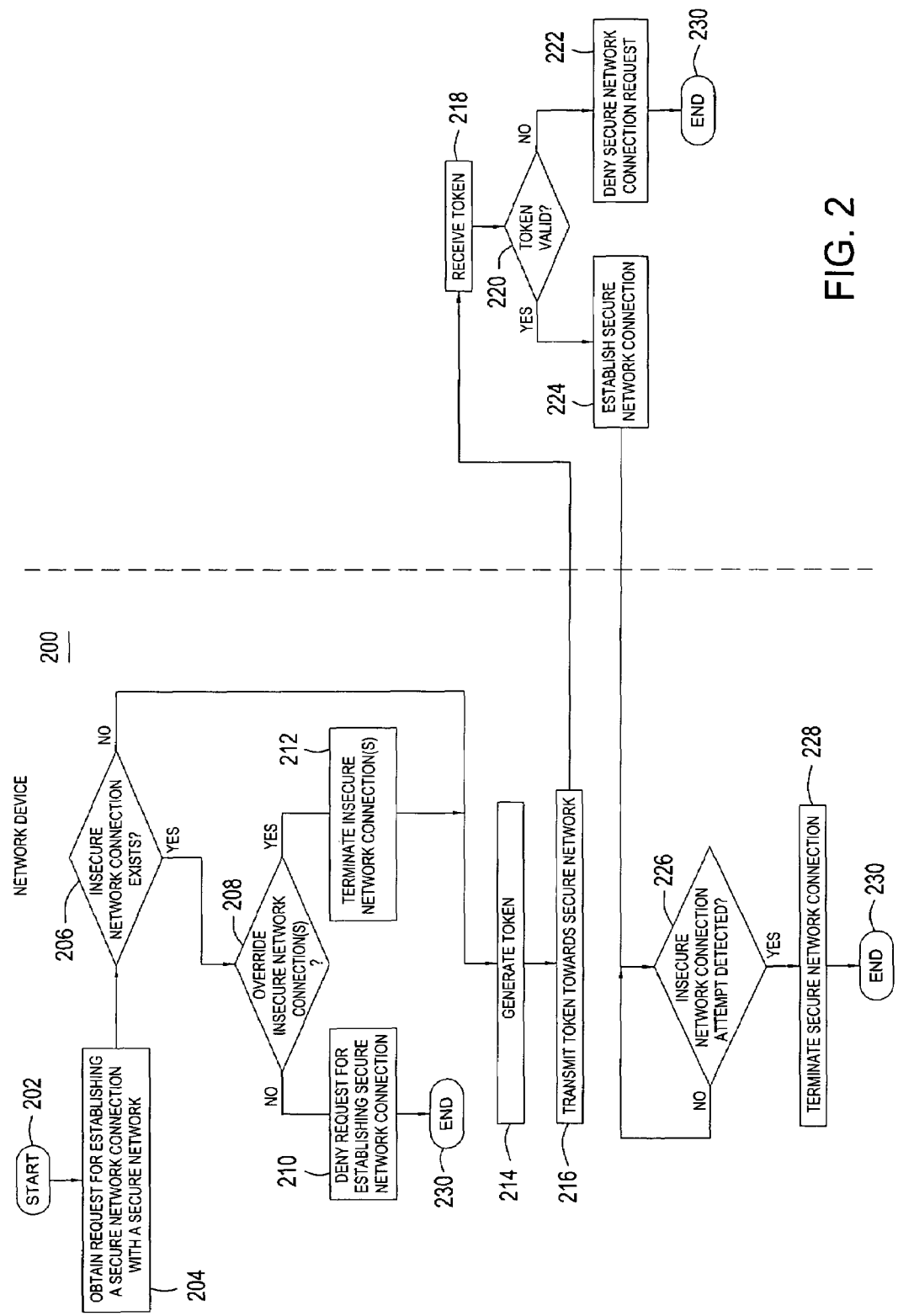
FIG. 2 depicts a flow diagram of a method according to one embodiment of the invention.

FIG. 2 depicts a flow diagram of a method according to one embodiment of the invention. Specifically, method 200 of FIG. 2 comprises a method for preventing a bridge between a secure network and an insecure network. Although a portion of the steps are depicted as being performed serially, those skilled in the art will appreciate that at least a portion of the steps of method 200 may be performed contemporaneously, as well as in a different order than presented in FIG. 2. As depicted in FIG. 2, steps 202-216 and 226-228 are performed by a network device (illustratively, ND 110 depicted in FIG. 1), and steps 218-224 are performed by a network element associated with the SN (e.g., by AN 142 depicted in FIG. 1). The method 200 is entered at step 202 and proceeds to step 204.

At step 204, a request for accessing a secure network is obtained. In general, a request for accessing a secure network comprises a request for establishing a secure network connection with a secure network. In one embodiment, the request for establishing the secure network connection is obtained in response to activation of a network device. Similarly, in another embodiment, the request for establishing the secure network connection is obtained in response to manual initiation of a connection request by a user via a user interface associated with the network device. In one embodiment, as described herein, a secure network comprises an enterprise network.

At step 206, a determination is made as to whether an insecure network connection exists. As described herein, an insecure network connection comprises a connection between a network device (illustratively, ND 110) and an insecure network (illustratively, IN 130). Although described with respect to a one insecure network connection, it should be noted that a plurality of insecure network connections may exist. If an insecure network connection does not exist, the method 200 proceeds to step 214. If an insecure network connection does exist, the method 200 proceeds to step 208.

In one embodiment, the determination as to whether an insecure network connection exists is performed by calling at least one function (e.g., calling an application programming interface (API) of an associated Operating System (OS)) for identifying active network connections and associated active network connection information. In one embodiment, the active network connection information (e.g., the IP address, the type of security functions used for establishing the active network connection, and the like) is used to identify insecure network connections active on the network device.

In one embodiment, on a network device running Microsoft Windows®, a Windows® network-layer API such as the GetAdaptersInfo function is used for identifying active network connections, obtaining network properties, and obtaining network adapter properties associated with each of the network adaptors supporting the active network connections. For example, network properties comprise IP address, gateway IP address, domain name server (DNS) prefix, and like network properties. Similarly, for example, network adapter properties comprise adapter name, adapter description, adapter address, IP address, IP mask, and like network adapter properties.

Furthermore, similar functions (e.g., various API calls) may be utilized for determining a status associated with active network connections, where the status comprises one of: secure and insecure. In continuation of the above example, on a network device running Windows®, additional functions such as GetInterfaceInfo, GetPerAdapterInfo, and like functions may be used for determining whether security functions (e.g., authentication) were used during establishment of the active network connections. In one embodiment, use of various security functions for establishing a network connection may be indicative of a secure network connection.

At step 208, a determination is made as to whether to override the insecure network connection(s). For example, if a user has configured a network device to enable establishment of a secure connection in place of all existing insecure network connections, the determination as to whether to override the insecure network connection(s) is performed using at least one configuration parameter. If the insecure network connection(s) is not overridden, method 200 proceeds to step 210. If the insecure network connection is overridden, the method 200 proceeds to step 212.

At step 210, in which an existing insecure network connection(s) is not overridden, the request for establishing the secure network connection is denied. In one embodiment, the denial of the request to establish the secure network connection is displayed to at least one user interface associated with the network device from which the request was initiated. The method 200 then proceeds to step 230, where the method 200 ends. At step 212, in which the existing insecure network connection(s) is overridden, the existing insecure network connection(s) is terminated. The method 200 then proceeds to step 214.

In one embodiment (not depicted), the request for establishing the secure network connection is not denied. In one such embodiment, the network device re-attempts establishment of a secure network connection. In this embodiment, method 200 returns to step 206 (i.e., the network device continues to monitor for the existence of an insecure network connection). In this embodiment, as long as any insecure network connection persists, a valid token is not generated. In one embodiment, the network device may attempt to establish a secure network connection; however, since a valid token is not generated, the attempt to establish the secure network connection fails, thereby preventing bridging of the secure network and the insecure network.

At step 214, a token is generated. In one embodiment, generation of the token depends upon the access technology used for establishing a secure network connection between the network device and the secure network. In one embodiment, the token comprises an identifier operable for establishing a connection at the network layer. In one embodiment, the token is configured on the network device and the secure network such that generation of the token comprises selecting a token that is recognizable by the secure network. In another embodiment, the token is generated by the network device using an algorithm configured on the network device and the secure network. In one such embodiment, the generated token is variable over time.

At step 216, the token is transmitted towards the secure network. In one embodiment, the token is transmitted towards at least one access node (illustratively, AN 142) associated with the secure network. For example, in one embodiment, the token is transmitted towards the secure network as a portion of a connection request message (e.g., a secure network connection request message). As described herein with respect to generation of the token, transmission of the token is dependent upon the access technology utilized by the network device for establishing a secure network connection with the secure network.

In one embodiment, for example, for a network device utilizing dialup to establish the secure network connection, the token is transmitted during the point-to-point protocol (PPP) setup phase (e.g., as a portion of network device authentication). In another embodiment, for example, for a network device utilizing a VPN to establish the secure network connection, the token is transmitted to a VPN gateway (illustratively, AN 142) during the VPN setup phase. In another embodiment, for example, for a network device utilizing dynamic host configuration protocol (DHCP) to establish the secure network connection, the network device transmits the token as a DHCP class identifier option.

In another embodiment, for example, for a network device utilizing a wireline and/or wireless network access protocol (e.g., an 802.1x port-based network access protocol often used in conjunction with wireless and fixed LAN network access protocols) to establish the secure network connection, the network device establishes a secure tunnel with an access node (illustratively, AN 142) for exchanging the token. In one embodiment, a token is exchanged using an extensible authentication protocol (EAP). For example, in one such embodiment, a secure tunnel is established using the tunnel transport layer security (TTLS) feature of EAP.

Similarly, in one embodiment, various other mechanisms supported by EAP may be used for transmitting the token from the network device to the secure network. For example, Transport Level Security (TLS), Subscriber Identity Module (SIM), Authentication and Key Agreement (AKA), Message Digest 5 (MD5), and like EAP mechanisms and features may be used for exchanging the token between the network device and the secure network. Furthermore, in another embodiment, the token is transmitted as a portion of authentication processing using at least one parameter (e.g., a user name parameter, a password parameter, and like parameters).

As such, generation and transmission of the token towards the secure network for establishing the secure network connection varies according to network device type, network interface type, access network type, access control type, secure network technology type, authentication protocol type, and like parameters. Furthermore, although described with respect to dialup, VPN, DHCP, and wireline/wireless communications protocols, it should be noted that token generation and token transmission may be performed using other communications technologies, protocols, and the like.

At step 218, the token is received. In one embodiment, the token is received by an access node (illustratively, AN 142) associated with the secure network to which access is requested. In one embodiment, in which a token is not received, the missing token is deemed to be an invalid token. At step 220, a determination is made as to whether the received token is valid. As described herein, successful validation of the token provides an indication to the access node (i.e., to the secure network) that the network device from which the token is received is not currently supporting an insecure network connection to an insecure network. If the received token is invalid, method 200 proceeds to step 222. If the received token is valid, method 200 proceeds to step 224.

In one embodiment, in which a valid token is preconfigured on both the network device and the secure network, the determination as to whether the token is valid comprises comparing the received token to the set of valid tokens preconfigured on the secure network (i.e., stored on AN 142). If the received token matches a valid token configured on the access node, the received token is valid. If the received token does not match a valid token configured on the access node, the received token is not valid. If the token is generated by the network device using an algorithm, the determination as to whether the token is valid comprises applying an associated algorithm to the token (similar to use of data encryption/decryption, data signing/verification, and the like for ensuring the secure transmission of information).

At step 222, the request for accessing the secure network (i.e., the secure network connection request) is denied. In one embodiment, denial of the secure network connection request is communicated to the network device from which the secure network connection request was received. For example, AN 142 generates a negative acknowledgment (NACK) message and transmits the NACK message to ND 110. Although not depicted, in one embodiment, the method 200 may return to step 206 (i.e., upon receiving the NACK the network device may reattempt establishment of the secure network connection). The method 200 then proceeds to step 230, where the method 200 ends.

At step 224, the secure network connection between the network device and the secure network is established. In one embodiment, the successful establishment of a secure network connection is communicated to the network device from which the request for accessing the secure network was received. For example, AN 142 generates an acknowledgment (ACK) message and transmits the ACK message to ND 110. In one embodiment, the secure network connection comprises a network layer connection. In one such embodiment, the access node assigns an IP address to the network device and transmits the assigned IP address to the network device for completing establishment of the secure network connection.

At step 226, a determination is made as to whether an insecure network connection attempt is detected. In one embodiment, an insecure network connection attempt comprises an automatic attempt to establish an Internet connection. For example, an automatic connection attempt occurs upon insertion into the network device of a NIC comprising automatic connection capabilities. Similarly, in another embodiment, an insecure network connection attempt occurs in response to a manual request to access the Internet (e.g., a manual request initiated by a user via a user interface associated with a network device).

In one embodiment, a determination as to whether an insecure network connection attempt is detected is performed by continuously monitoring for an insecure connection attempt. For example, a network device may continuously monitor at least one locally stored routing table for addition of a routing table entry associated with an insecure connection attempt. In another embodiment, a determination as to whether an insecure network connection attempt is detected is performed by comparing an IP address associated with a connection request to a predefined IP address range associated with a secure network. Similarly, in another example, a domain name system (DNS) domain name associated with a network connection request is compared to at least one predefined DNS domain name associated with a secure network.

In another embodiment, for example, monitoring for the detection of an insecure network connection attempt comprises periodically calling at least one function (e.g., the Microsoft Windows® GetAdaptersInfo function and like functions as described herein) for identifying an insecure network connection attempt. If an insecure network connection attempt is not detected, method 200 remains at step 226. In other words, the network device continues to monitor for the detection of an insecure network connection attempt. If an insecure network connection attempt is detected, method 200 proceeds to step 228.

At step 228, the secure network connection is terminated. In one embodiment, termination of the secure network connection depends upon the technology used to establish the secure network connection. For example, termination of a secure network connection established using DHCP requires calling at least one API function at the network level for releasing the secure DHCP connection. Although not described herein, various other methods for releasing the secure network connection may be employed depending upon the technology used to establish the secure network connection. In one embodiment, termination of the secure network connection comprises deletion of the token by the network device. The method 200 then proceeds to step 230, where the method 200 ends.

According to the methodologies of the present invention, the secure network requires a valid token before allowing a network device to establish a connection with the secure network. As such, the present invention enables an additional level of security for preventing bridging of secure networks and insecure networks. For example, in an embodiment in which a network device is not equipped to generate a valid token, upon receiving a request (in which the token is missing) from the network device to establish the secure network connection, the secure network denies the secure network connection attempt. As such, as described herein, a missing token is treated as an invalid token by the secure network.

It is contemplated that at least a portion of the described functions may be combined into fewer functional elements. Similarly, it is contemplated that various functions may be performed by other functional elements, or that the various functions may be distributed across the various functional elements in a different manner. Furthermore, although primarily described herein with respect to an enterprise network, those skilled in the art will appreciate that the methodology of FIG. 2 may be used to prevent bridging between insecure networks and various other secure networks.

Figure 3:
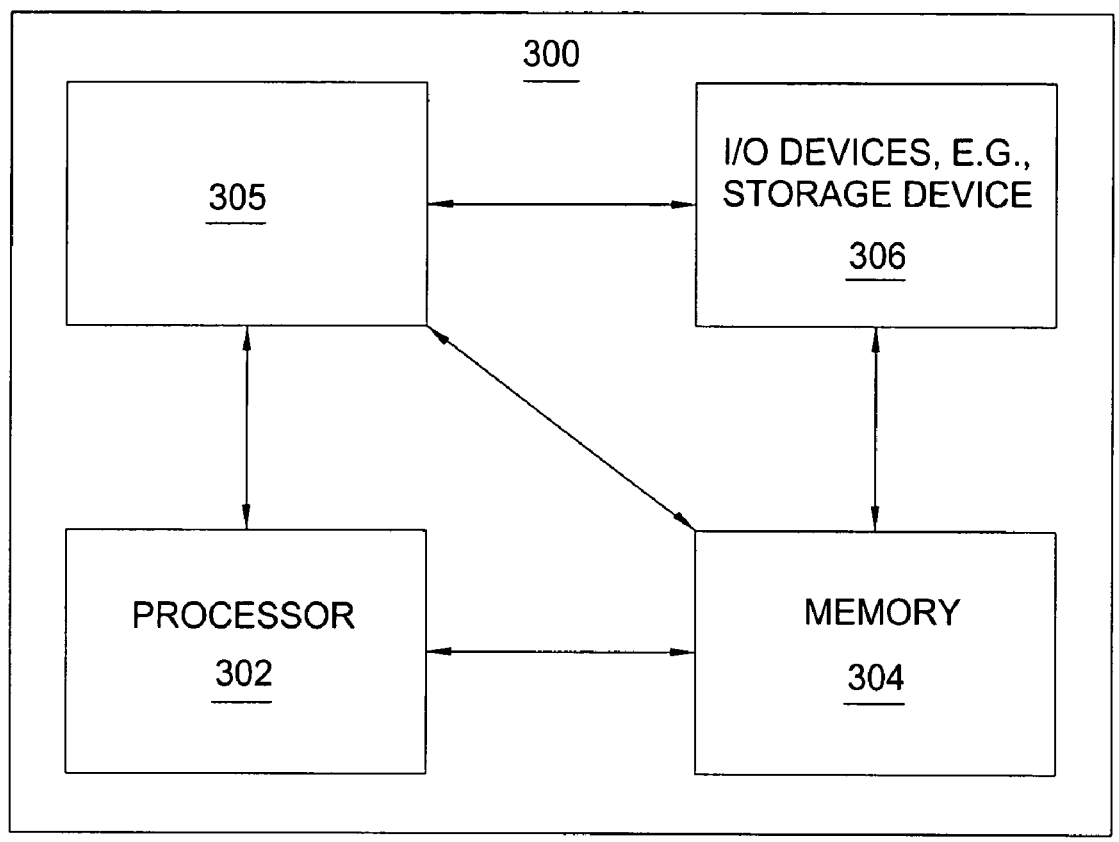
FIG. 3 depicts a high level block diagram of a general purpose computer suitable for use in performing the functions described herein.

FIG. 3 depicts a high level block diagram of a general purpose computer suitable for use in performing the functions described herein. As depicted in FIG. 3, system 300 comprises a processor element 302 (e.g., a CPU), a memory 304, e.g., random access memory (RAM) and/or read only memory (ROM), a network bridging prevention module 305, and various input/output devices 306 (e.g., storage devices, including but not limited to, a tape drive, a floppy drive, a hard disk drive or a compact disk drive, a receiver, a transmitter, a network interface (illustratively, one of the NIs 112), a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present network bridging prevention module or process 305 can be loaded into memory 304 and executed by processor 302 to implement the functions as discussed above. As such, the network bridging prevention process 305 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. A method for preventing a bridge between a secure network and an insecure network at a network device, comprising:
   receiving, at a node associated with the secure network, a request to establish a secure network connection with the secure network, wherein the request to establish the secure network connection with the secure network is associated with the network device; and
   in response to a determination that the request to establish the secure network connection has associated therewith a token indicative that an insecure network connection to an insecure network does not exist for the network device, accepting the request to establish the secure network connection with the secure network;
   in response to a determination that the request to establish the secure network connection does not have associated therewith a token indicative that an insecure network connection to an insecure network does not exist for the network device, denying the request to establish the secure network connection with the secure network.

2. The method of claim 1, wherein the request to establish the secure network connection is initiated by the network device using a process comprising:
   obtaining a request for establishing the secure network connection;
   determining, in response to the request, whether an insecure network connection exists at the network device;
   in response to a determination that an insecure network connection does not exist at the network device, generating a token indicative that an insecure network connection to an insecure network does not exist at the network device; and
   transmitting the token toward the node associated with the secure network.

3. The method of claim 2, wherein determining whether an insecure network connection exists at the network device comprises:
   calling at least one function for determining whether an insecure network connection exists at the network device.

4. The method of claim 2, wherein generating the token comprises:
   generating the token using at least one algorithm, the at least one algorithm generating the token in a manner for enabling the node associated with the secure network to determine whether or not an insecure network connection exists for the network device.

5. The method of claim 1, wherein the token is received as at least a portion of a dynamic host configuration protocol (DHCP) class identifier option.

6. The method of claim 1, wherein the token is received as at least a portion of at least one extensible authentication protocol (EAP) parameter.

7. The method of claim 1, wherein the token is received at a virtual private network (VPN) gateway associated with the secure network, wherein the token is received as at least a portion of a virtual private network (VPN) setup phase.

8. The method of claim 1, wherein the token is received as at least a portion of a point-to-point protocol (PPP) setup phase.

9. The method of claim 1, further comprising:
   validating the token, wherein the token is validated by comparing the token associated with the request to establish the secure network connection to at least one token stored locally by the node associated with the secure network; and
   establishing the secure network connection in response to a determination that the token associated with the request to establish the secure network connection matches at least one token stored locally by the node associated with the secure network.

10. The method of claim 1, further comprising:
    monitoring the network device for an attempt to establish an insecure network connection to an insecure network; and
    invalidating the token in response to detecting an attempt to establish an insecure network connection with an insecure network.

11. A computer readable storage medium storing a software program, that, when executed by a computer, causes the computer to perform a method for preventing a bridge between a secure network and an insecure network at a network device, the method comprising:
    receiving, at a node associated with the secure network, a request to establish a secure network connection with the secure network, wherein the request to establish the secure network connection with the secure network is associated with the network device; and
    in response to a determination that the request to establish the secure network connection has associated therewith a token indicative that an insecure network connection to an insecure network does not exist for the network device, accepting the request to establish the secure network connection with the secure network;
    in response to a determination that the request to establish the secure network connection does not have associated therewith a token indicative that an insecure network connection to an insecure network does not exist for the network device, denying the request to establish the secure network connection with the secure network.

12. The computer readable storage medium of claim 11, wherein the request to establish the secure network connection is initiated by the network device using a process comprising:
    obtaining a request for establishing the secure network connection;
    determining, in response to the request, whether an insecure network connection exists at the network device;
    in response to a determination that an insecure network connection does not exist at the network device, generating a token indicative that an insecure network connection to an insecure network does not exist at the network device; and transmitting the token toward the node associated with the secure network.

13. The computer readable storage medium of claim 12, wherein determining whether an insecure network connection exists at the network device comprises:

calling at least one function for determining whether an insecure network connection exists at the network device.

14. The computer readable storage medium of claim 12, wherein generating the token comprises:

generating the token using at least one algorithm, the at least one algorithm generating the token in a manner enabling the secure network to determine whether or not an insecure network connection to an insecure network exists for the network device.

15. The computer readable storage medium of claim 11, wherein the token is received as at least one of: at least a portion of a dynamic host configuration protocol (DHCP) class identifier option, at least a portion of at least one extensible authentication protocol (EAP) parameter, at least a portion of a virtual private network (VPN) setup phase, and at least a portion of a point-to-point protocol (PPP) setup phase.

16. The computer readable storage medium of claim 11, further comprising:

validating the token, wherein the token is validated by comparing the token associated with the request to establish the secure network connection to at least one token stored locally at the node associated with the secure network; and establishing the secure network connection in response to a determination that the token associated with the request to establish the secure network connection matches at least one token stored locally by the node associated with the secure network.

17. The computer readable storage medium of claim 11, further comprising:

monitoring the network device for an attempt to establish an insecure network connection to an insecure network; and invalidating the token in response to detecting an attempt to establish an insecure network connection to an insecure network.

18. An apparatus for preventing a bridge between a secure network and an insecure network at a network device, comprising:

a receiver for receiving a request to establish a secure network connection with the secure network, wherein the request to establish the secure network connection with the secure network is associated with the network device; and a processor for processing the request, the processor configured for:

accepting the request to establish the secure network connection with the secure network in response to a determination that the request to establish the secure network connection has associated therewith a token indicative that an insecure network connection to an insecure network does not exist for the network device; and denying the request to establish the secure network connection with the secure network in response to a determination that the request to establish the secure network connection does not have associated therewith a token indicative that an insecure network connection to an insecure network does not exist for the network device.

* * * * *